3,382,296
COLOR INDICATORS FOR DETERMINING DEGREE OF CURE OF POLYESTER RESINS

David A. Tenquist and Daniel L. Edwards, Kingsport, Tenn., assignors to Eastman Kodak Company, Rochester, N.Y., a corporation of New Jersey
No Drawing. Filed Apr. 25, 1966, Ser. No. 544,808
5 Claims. (Cl. 260—864)

This invention relates to color indicators. More particularly it relates to use of certain peroxide-sensitive color indicators in determining the degree or amount of cure of polyester resins.

Peroxide-cured styrenated alkyd resins which are exemplary of the type of resins in which color indicators are useful, and other unsaturated polyesters, are disclosed in U.S. Patent 3,160,679 and other patents. In producing or applying such resins, it is often necessary to determine the state of cure. For instance, such resins are commonly applied by a spray-up method in which the polyester resin is mixed with a promoter in a tank. The resulting mixture is fed to a spray gun through a pressure line, a peroxide catalyst being metered separately into the spray gun. It is therefore important that the point be determined at which the catalyst reaches the proper concentration to cause the sprayed resin to cure properly on the surface to which applied. Unsaturated polyesters reinforced with fiber glass are also sometimes applied over a gel coat of the unreinforced polyester as back-up coats. Such back-up coats will not adhere to the gel coat unless the gel coat is satisfactorily cured. Therefore it is important to, in some way, measure the degree of cure. In a similar way it is important when an unsaturated polyester begins to cure after it is applied as a flow coating to determine the extent of cure in order to permit it to be worked into a smooth coating. Similarly, in repairing damaged areas of automobile bodies by application of catalyzed polyester and fiber glass reinforced matting, it is essential to cure the unsaturated polyester sufficiently to permit smooth sanding.

For all of the foregoing applications conventional color indicators such as phenothiazine and N,N'-diphenyl-p-phenylenediamine have heretofore been used. For comparison purposes phenothiazine will hereinafter be referred to as CC–112–G and CC–113–R and N,N'-diphenyl-p-phenylenediamine as CC–114–Y or DPPD. These numbers with identifying letters have been used by the U.S. Peroxygen Corporation, which markets these color indicators for such polyester cure purposes. DPPD, an aromatic-substituted p-phenylenediamine, has been found to be considerably less effective in such applications as a color indicator than phenothiazine. While both DPPD and phenothiazine have been useful in determining the state of cure of unsaturated polyesters, it has heretofore been necessary to use them in rather high concentrations in order to have a sufficient amount of color sensitivity for them to function satisfactorily as cure-indicating agents. At such high concentrations the indicators sometimes have a tendency to impart a very dark color to the polyester solution which does not fade appreciable during the curing operation. Also, there is a tendency for these color indicators to produce a color change which is somewhat difficult to read due to lightness of color and lack of sharp color changes over the cure period. Therefore it is apparent that a peroxide-sensitive color indicator which does not possess these disadvantages represents a highly desirable development. After extended investigation we have found such an indicator which exhibits a sharp polyester cure color change and is useful in low concentrations.

In its broader aspects our invention involves a peroxide-sensitive mixture of an unsaturated polyester and a compound having the formula:

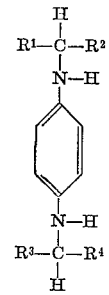

wherein $R^1$, $R^2$, $R^3$ and $R^4$ are the same or different aliphatic groups having 1–6 carbon atoms. Preferred compounds include N,N'-bis(1-methylheptyl-p-phenylenediamine; N,N' - bis(1 - ethyl - 3 - methylpentyl) - p - phenylenediamine; N,N' - bis(1,4 - dimethylpentyl) - p - phenylenediamine; N,N' - di - sec - butyl - p - phenylenediamine and N,N'-diisopropyl-p-phenylenediamine. Surprisingly we have found that although these compounds are secondarily substituted aliphatic N,N'-diphenyl-p-phenylenediamines, and therefore more closely resemble the substituted aromatic p-phenylenediamine heretofore used as an unsaturated polyester color indicator, they are even more sensitive indicators and useful in even smaller amounts than phenothiazine, which is of an entirely different chemical structure.

The color indicators used in admixture with unsaturated polyesters according to our invention are the reaction products of p-nitroaniline and aliphatic ketones. Further description thereof is to be found in U.S. Patent 2,381,015 of our coworkers Von Bramer and Davy. Von Bramer and Davy suggest their use in retarding the deterioration of cracked gasoline.

The following examples will serve to illustrate the color indicating compounds of the present invention, but are not intended to limit this invention in any way.

In all of the examples that follow a general-purpose, commercial polyester resin of propylene glycol with equal moles of phthalic anhydride and of maleic anhydride was used as the basic polyester. The polyester was used in a 33% styrene solution (commercially available). The benzoyl peroxide (BPO) catalyst used was a 50% solution in styrene. The methyl ethyl ketone peroxide (MEK peroxide) was Lupersol DDM, a 60% solution in dimethyl phthalate. The cobalt promoter used in the examples was 6% cobalt naphthenate.

Three series of tests were conducted in order to demonstrate the improved sensitivity of the color indicators of this invention. In one series of experiments, the color change sensitivities of all indicators were compared by dispersing the color indicators in the polyester resin. The appropriate amount of catalyst and promoter were added with stirring. The changes in color and the time required for these changes are recorded in Tables 1 and 2 hereinafter.

In a second series of experiments, gelation time measurements and the preparation of one-ply glass mat laminates were used to determine the effect of the indicator on the cure properties of the polyester. Gelation times were determined with a Sunshine Gel Time Meter. The progress of room temperature cure of the glass-reinforced laminates were measured with a Barcol hardness impressor. See Table 3 hereinafter.

In a third series of experiments, the storage stability of the indicators in polyester-styrene solutions or in polyester-styrene solutions containing a promoter were determined. Glass bottles containing resin-indicator solutions were stored in the dark, and the stability of each indicator was checked by periodically catalyzing a small portion of each solution with 1% benzoyl peroxide. The resin-indicator solution was considered to be stable if there was a visible color change upon the addition of the peroxide. Results are recorded in Table 4 hereinafter.

Results of the tests described in the following illustrative examples are given in the tables specifically referred to in each example. The concentration of each color indicator used is shown in every instance as percent by weight of the total weight of polyester in which used.

In the examples and tables N,N'-bis(1-ethyl-3-methylpentyl)-p-phenylenediamine will be referred to as EMPPD, dimethylaniline as DMA, methyl ethyl ketone peroxide as MEK peroxide, and N,N'-bis(1,4-dimethylpentyl)-p-phenylenediamine as DMPPD, N,N'-bis(1-methylheptyl)-p-phenylenediamine as MHPD, N,N'-di-sec-butyl-p-phenylenediamine as DBPD, N,N'-diisopropyl-p-phenylenediamine as DIPPD.

EXAMPLE 1

A stock solution of 0.01% N,N'-bis(1-ethyl-3-methylpentyl)-p-phenylenediamine (EMPPD) was prepared by adding 0.03 gm. of EMPPD to 300 gms. of polyester resin. To 10 gms. of this solution there was added 0.02 gm. of dimethyl aniline (DMA) promoter and 0.1 gm. of BPO with rapid stirring. The resin changed from a dark blue color to a very dark red in less than 5 seconds, as shown in Tables 1 and 2. The time for color change was determined as the time interval for a visible color change in the resin after addition of the BPO. To a second 10 gms. of this stock solution there was added 0.05 gm. of cobalt naphthenate promoter and 0.1 gm. of MEK peroxide with rapid stirring. The resin changed from a dark blue color to a light red color in 120 seconds. These results are shown in Tables 1 and 2, which follow. Table 1 shows how much smaller quantities of the color stabilizers of this invention show just as rapid color change as prior art indicators, in fact, much faster than some. Table 2 demonstrates how as little as 0.001% by weight of the indicators of this invention gives a pronounced rapid color change.

TABLE 1.—INDICATOR COLOR CHANGE UPON ADDITION OF PEROXIDE

[Indicator level: 0.2% (based on total weight of polyester)]

| Indicator Concentration (Based on Total Weight of Polyester) | Indicator | Original Color | 1% MEK plus 0.5% Cobalt | | Appearance of Cured Polyester | 1% BPO plus 0.2% DMA | |
|---|---|---|---|---|---|---|---|
| | | | Color Change | Time, sec.[1] | | Color Change | Time, sec. |
| 0.2 | CC-112-G | Dark Brown | Light Green | 120 | Disclosed | Very Dark Green | 5-10 |
| 0.2 | CC-113-R | do | do | 120 | do | do | 5-10 |
| 0.2 | CC-114-Y | Dark Brown-Red | Light Orange | 240 | do | Yellow-Orange | 120 |
| 0.01 | EMPPD | Dark Blue | Light Red | 120 | Natural | Very Dark Red | 5 |

[1] Time interval for a visible color change after addition of peroxide.

TABLE 2.—COLOR CHANGE SENSITIVITY AT VARIOUS INDICATOR CONCENTRATIONS

[Catalyst level: 1% benzoyl peroxide, 0.2% dimethyl aniline]

| Indicator Concentration (Based on Total Weight of Polyester) | Indicator | Original Polyester and Indicator Color | With 1% BPO Color Changed to— | Time, sec.[1] |
|---|---|---|---|---|
| (0.1%) | EMPPD | Very Dark Blue | Very Dark Red | 5 |
| (0.01%) | EMPPD | Dark Blue | do | 5 |
| (0.001%) | EMPPD | Light Blue | Red-Pink | 15-20 |
| (0.01%) | CC-112-G | Light Yellow | Light Green | 20-25 |
| (0.01%) | CC-114-Y | do | Yellow | 30-40 |
| (0.01%) | MHPD | Rose | Red | 15 |
| (0.1%) | MHPD | Rose Brown | Very Dark Red | 5 |
| (0.1%) | DMPPD | do | do | 5 |
| (0.01%) | DMPPD | Rose | Red | 15 |
| (0.1%) | DBPD | Pink | Very Dark Red | 5 |
| (0.1%) | DIPPD | Brown | do | 10 |
| (0.1%) | CI-1 | Blue | Dark Red | 5-10 |

[1] Time interval for a visible color change after addition of peroxide.

EXAMPLE 2

This example demonstrates how the color indicators of this invention have no adverse effect upon the cure properties of the polyester resin in which used.

To 50 gms. of the stock solution prepared in Example 1 (0.01% EMPPD) was added 0.1 gm. of DMA promoter and 0.5 gm. of BPO and stirred for one minute. Room temperature gelation time was recorded as the time interval from addition of BPO until the viscosity increase caused by gelation of the resin was sufficient to close the points of the Sunshine Gel Time Meter which were set ⅛″ apart. One-ply laminates were made by catalyzing 50 gms. of the stock solution made in Example 1 with 0.1 gm. of DMA and 0.5 gm. of BPO and saturating a 3″ square section of ½-oz. chopped-strand fiberglass mat. This was done between two pieces of glass separated by a ⅛″ Teflon gasket. After ½-hour the top glass piece was removed and the progress of room temperature cure of the resin was recorded by taking periodic hardness determinations with the Barcol hardness impressor. The results shown in Table 3 indicate that EMPPD at 0.01% does not have any significant effect on the cure properties of the resin.

TABLE 3.—THE EFFECT OF COLOR INDICATORS ON CURE PROPERTIES

| Indicator Concentration (Based on Total Weight of Polyester) | Indicator | Room Temp. Gelation Time (Minutes) | Barcol Hardness | | | | |
|---|---|---|---|---|---|---|---|
| | | | ½ Hour | 1 Hour | 2 Hours | 4 Hours | 24 Hours |
| (0.01%) | EMPPD | 13 | 15 | 40 | 45 | 45 | 50 |
| (0.01%) | EMPPD | 12.5 | 15 | 45 | 45 | 50 | 50 |
| (0.2%) | CC-112-G | 13 | | | | | |
| (0.01%) | CC-112-G | 12.5 | 15 | 40 | 45 | 45 | 50 |
| (0.01%) | CC-114-Y | 12.5 | 10 | 35 | 45 | 45 | 50 |
| (0.1%) | DMPPD | 27 | | | | | |
| (0.01%) | DMPPD | 13.7 | | | | | |
| | CI-1 | 13 | | | | | |
| | Control | 11.5 | 10 | 30 | 45 | 45 | 50 |

EXAMPLE 3

This example demonstrates the excellent storage stability of the color stabilizers of this invention.

Color indicator storage stability was determined by periodically catalyzing 10 gms. of the stock solution prepared in Example 1 with 0.1 gm. of BPO and 0.02 gm. of DMA. The point in time when the indicator-resin solution would give no color indication upon addition of DMA and BPO was taken as the indicator storage life in polyester resins. To 50 gms. of stock solution prepared in Example 1 was added 0.1 gm. of DMA and stored in a glass bottle. This indicator-polyester-promoter solution was tested periodically by adding 0.5 gm. of BPO. The point in time that a color change failed to develop upon addition of BPO was taken as the indicator storage stability in polyester resins containing 0.2% DMA promoter. These results are shown in Table 4. Storage life of EMPPD in polyester resins is limited to 15–18 days and storage stability in promoted polyester resins is 8 days.

TABLE 4.—COLOR INDICATOR STORAGE STABILITY IN POLYESTER RESINS

| Indicator Concentration (Based on Total Weight of Polyester) | Indicator | Storage Life [1] In— | |
|---|---|---|---|
| | | Polyester Resins, Days | Resins Promoted with 0.2% DMA, Days |
| (0.1%) | EMPPD | 15–18 | 8 |
| (0.01%) | EMPPD | 15–18 | 8 |
| (0.01%) | NHPD | 12–15 | 5 |

[1] Determined by catalyzing a small portion with 1% BPO.

EXAMPLE 4

This example demonstrates that the color indicators of this invention can be used effectively with conventional diluents such as organic ester plasticizers.

The processes of Examples 1 and 2 were repeated with a stock solution prepared by adding 0.3 gm. of color indicator CI–1 to 300 gms. of resin. CI–1 was prepared by mixing 1 gm. of EMPPD, 3 gms. of 2,2,4-trimethyl-1,3-pentanediol diisobutyrate, 3 gms. of dibutyl phthalate and 3 gms. of dimethyl phthalate. Results are shown in Tables 2 and 3 hereinabove. These results indicate that EMPPD can be used in connection with a diluent without any loss of effectiveness or any detrimental effect on cure properties of the resin.

A preferred range of concentration of the color indicators of this invention is from 0.2% to 0.001% based on the weight of the polyester solution. The color indicators of this invention can be readily used as a solution with many standard diluents, such as, dimethyl phthalate, butyl benzyl phthalate, dibutyl phthalate, 2,2,4-trimethyl-1,3-pentanediol diisobutyrate, dioctyl phthalate, etc.

This invention has been described in considerable detail with reference to certain embodiments thereof, but it will be understood that variations and modifications can be effected within the spirit and scope of the invention as described hereinabove, and as defined in the appended claims.

1. A peroxide-sensitive mixture comprising an unsaturated polyester, a liquid vinyl monomer and a compound having the formula:

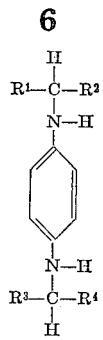

wherein $R^1$, $R^2$, $R^3$ and $R^4$ are each the same or different aliphatic groups having from 1 to 6 carbon atoms.

2. A mixture as claimed in claim 1 wherein said compound is present in concentrations of from .001% to 0.2% based on the weight of the polyester.

3. A mixture of claim 2 wherein the compound is selected from the group consisting of N,N'-bis(1-methylheptyl)-p-phenylenediamine; N,N'-bis(1-ethyl-3-methylpentyl) - p - phenylenediamine; N,N'-bis(1,4-dimethylpentyl)-p-phenylenediamine; N,N'-di-sec-butyl-p-phenylenediamine and N,N'-diisopropyl-p-phenylenediamine.

4. A process for indicating the state of cure of a peroxide-catalyzed unsaturated polyester comprising the steps of adding to an unsaturated polyester from 0.001% to 0.2% by weight of a peroxide-sensitive color indicator selected from the group consisting of N,N'-bis(1-methylheptyl)-p-phenylenediamine; N,N'-bis(1-ethyl-3-methylpentyl) - p - phenylenediamine; N,N'-bis(1,4-dimethylpentyl)-p-phenylenediamine; N,N'-di-sec-butyl-p-phenylenediamine and N,N'-diisopropyl-p-phenylenediamine.

5. In the process for curing a peroxide catalyzed unsaturated polyester, the improvement which comprises adding to said unsaturated polyester a peroxide sensitive color indicator in an amount of from 0.001% to 0.2% by weight of a compound having the formula:

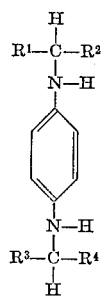

wherein $R^1$, $R^2$, $R^3$ and $R^4$ are each the same or different aliphatic groups having from 1 to 6 carbon atoms.

References Cited

UNITED STATES PATENTS

| 2,381,015 | 8/1945 | Von Bramer | 260—577 |
| 2,603,659 | 7/1952 | Raasch | 260—518 |

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,382,296                                                           May 7, 1968

David A. Tenquist et al.

It is certified that error appears in the above identified patent and that said Letters Patent are hereby corrected as shown below:

Column 2, line 68, "were" should read -- was --. Columns 3 and 4, TABLE 1, sixth column, line 1 thereof, "Disclosed" should read -- Discolored --; same columns 3 and 4, TABLE 2, first column, line 1 thereof, "(0.1)%" should read -- (0.1%) --. Column 3, line 49, "phenylenediamie" should read -- phenylenediamine --. Columns 3 and 4, TABLE 3, "(Minutes)" should not appear as a subheading but as a part of the main heading to the third column; same TABLE 3, first column, line 2 thereof, "(0.01%)" should read -- (0.001%) --.

Signed and sealed this 10th day of March 1970.

(SEAL)
Attest:

EDWARD M. FLETCHER, JR.                                        WILLIAM E. SCHUYLER, JR.
Attesting Officer                                                   Commissioner of Patents